(12) United States Patent
Kanno

(10) Patent No.: US 12,535,060 B2
(45) Date of Patent: Jan. 27, 2026

(54) SOFT ACTUATOR FIXING METHOD AND SOFT ACTUATOR DEVICE

(71) Applicant: RIVERFIELD INC., Tokyo (JP)

(72) Inventor: Takahiro Kanno, Tokyo (JP)

(73) Assignee: RIVERFIELD INC., Tokyo (JP)

(*) Notice: Subject to any disclaimer, the term of this patent is extended or adjusted under 35 U.S.C. 154(b) by 0 days.

(21) Appl. No.: 18/918,716

(22) Filed: Oct. 17, 2024

(65) Prior Publication Data

US 2025/0035093 A1    Jan. 30, 2025

Related U.S. Application Data

(63) Continuation of application No. PCT/JP2022/018239, filed on Apr. 20, 2022.

(51) Int. Cl.
*F03G 7/06* (2006.01)
*B33Y 80/00* (2015.01)

(52) U.S. Cl.
CPC .............. *F03G 7/061* (2021.08); *B33Y 80/00* (2014.12)

(58) Field of Classification Search
CPC ..... F03G 7/061; B33Y 80/00; F15B 2215/30; F15B 15/10
See application file for complete search history.

(56) References Cited

U.S. PATENT DOCUMENTS

| | | | | |
|---|---|---|---|---|
| 1,075,380 A | * | 10/1913 | Richardson | F23N 3/06 236/26 B |
| 2,109,459 A | * | 3/1938 | Best | F01L 1/252 251/23 |
| 3,162,213 A | * | 12/1964 | Peters | F16L 55/052 138/30 |
| 4,995,304 A | | 2/1991 | Daimler | |
| 2015/0369264 A1 | * | 12/2015 | Felt | G01D 5/14 92/90 |
| 2016/0375590 A1 | * | 12/2016 | Lessing | B25J 19/0075 294/196 |
| 2017/0340687 A1 | | 11/2017 | Nakao et al. | |
| 2019/0168398 A1 | * | 6/2019 | Lessing | B25J 15/0023 |
| 2020/0156840 A1 | | 5/2020 | Komann et al. | |
| 2021/0307773 A1 | * | 10/2021 | Hirata | A61B 17/2909 |
| 2024/0278440 A1 | * | 8/2024 | Alambeigi | A61B 34/30 |

FOREIGN PATENT DOCUMENTS

| | | |
|---|---|---|
| JP | 57169805 U | 4/1981 |
| JP | 2018-520896 A | 8/2018 |
| JP | 2019-207017 A | 12/2019 |

\* cited by examiner

*Primary Examiner* — Hoang M Nguyen
(74) *Attorney, Agent, or Firm* — Sughrue Mion, PLLC

(57) ABSTRACT

Disclosed is a method for fixing a soft actuator to a base, the soft actuator including a cylinder that includes a flange at an end in an axial direction, the cylinder being elastic in the axial direction and in a circumferential direction; and a coil that is wound around the cylinder in a spiral shape, suppresses a diameter expansion of the cylinder, and extends and contracts in the axial direction in accordance with an extension and contraction of the cylinder in the axial direction due to an increase and decrease in pressure within the cylinder, the base having a recess that has a groove, the method including engaging the flange and the groove with each other to fix the soft actuator to the base.

20 Claims, 3 Drawing Sheets

SOFT ACTUATOR FIXING METHOD AND SOFT ACTUATOR DEVICE

CROSS REFERENCE TO RELATED APPLICATION

This application is a continuation application of International Patent Application No. PCT/JP2022/018239 filed on Apr. 20, 2022, in the Japan Patent Office, the contents of which being incorporated by reference herein in its entirety.

BACKGROUND

The present disclosure relates to a soft actuator fixing method and a soft actuator device.

Soft actuators are power sources utilizing the properties of self-deforming materials. For example, a soft actuator can be utilized as an alternative to a conventional pneumatic cylinder.

SUMMARY

It is an aspect to provide a soft actuator device and a soft actuator fixing method that allows a soft actuator to be firmly fixed to a base.

According to an aspect of one or more embodiments, there is provided a method for fixing a soft actuator to a base, the soft actuator including a cylinder that includes a flange at an end in an axial direction, the cylinder being elastic in the axial direction and in a circumferential direction; and a coil that is wound around the cylinder in a spiral shape, suppresses a diameter expansion of the cylinder, and extends and contracts in the axial direction in accordance with an extension and contraction of the cylinder in the axial direction due to an increase and decrease in pressure within the cylinder; the base having a recess that comprises a groove, the method comprising engaging the flange and the groove with each other to fix the soft actuator to the base.

According to another aspect of one or more embodiments, there is provided a soft actuator device comprising a soft actuator comprising a cylinder that is elastic in an axial direction and in a circumferential direction, the cylinder including a flange at an end in the axial direction, and a coil that is wound around the cylinder, suppresses a diameter expansion of the cylinder, and extends and contracts in the axial direction in accordance with an extension and contraction of the cylinder in the axial direction due to an increase and decrease in pressure within the cylinder; and a base comprising a recess that has a groove, the groove engaging with the flange of the cylinder.

According to yet another aspect of one or more embodiments, there is provided a soft actuator device comprising a soft actuator comprising an elastic body that is configured to extend and contract in an axial direction and in a radial direction, and a coil that is wound around the elastic body, that is configured to extend and contract in the axial direction in accordance with the elastic body, and that is configured to suppress an expansion of the elastic body in the radial direction; and a base that receives an end of the soft actuator.

BRIEF DESCRIPTION OF DRAWINGS

Various example embodiments will be more clearly understood from the following detailed description taken in conjunction with the accompanying drawings, in which.

DETAILED DESCRIPTION

In the related art, a soft actuator may be configured to facilitate an extension and contraction of a silicone tube in an axial direction through an application of pressure within an internal space of the silicone tube, while simultaneously limiting a radial expansion of the silicone tube through use of a metal spring wound around an outer circumference of the silicone tube.

However, such a soft actuator has some disadvantages. For example, the soft actuator is constituted solely of a flexible component. Accordingly, it is necessary to fix the soft actuator to a rigid base in order to utilize the soft actuator as a mechanical component. Moreover, in the related art, a fixing method for a soft actuator is not established.

The present disclosure has been made in view of the above disadvantages. It is an aspect of the present disclosure to provide a soft actuator device and a soft actuator fixing method that allows a soft actuator to be firmly fixed to a base.

According to some embodiments, a soft actuator fixing method may be a method for fixing a soft actuator to a base, where the soft actuator includes a cylinder that is elastic in an axial direction and a circumferential direction, and a coil that is wound around the cylinder in a spiral shape, that suppresses diameter expansion of the cylinder, and that extends and contracts in the axial direction in accordance with extension and contraction of the cylinder in the axial direction due to increase and decrease in pressure within the cylinder, where the cylinder includes a flange at an end in the axial direction, the base has a recess that receives the end, and the recess has a groove that engages with the flange. The soft actuator fixing method may comprise engaging the flange and the groove with each other to fix the soft actuator to the base.

According to some embodiments, a soft actuator device may include a soft actuator, and a base, the soft actuator being fixed to the base. The soft actuator may include a cylinder that is elastic in an axial direction and a circumferential direction; and a coil that is wound around the cylinder in a spiral shape, suppresses diameter expansion of the cylinder, and extends and contracts in the axial direction in accordance with extension and contraction of the cylinder in the axial direction due to increase and decrease in pressure within the cylinder; the cylinder includes a flange at an end in the axial direction; the base has a recess that receives the end; and the recess has a groove that engages with the flange.

According to various embodiments, the soft actuator can be firmly fixed to the base.

Hereinafter, some embodiments will be described with reference to the drawings. In the following drawings, only the main components necessary for the description of the embodiments are depicted in a simplified manner for illustrative purposes.

[Configuration of Soft Actuator Device]

Figure 1:
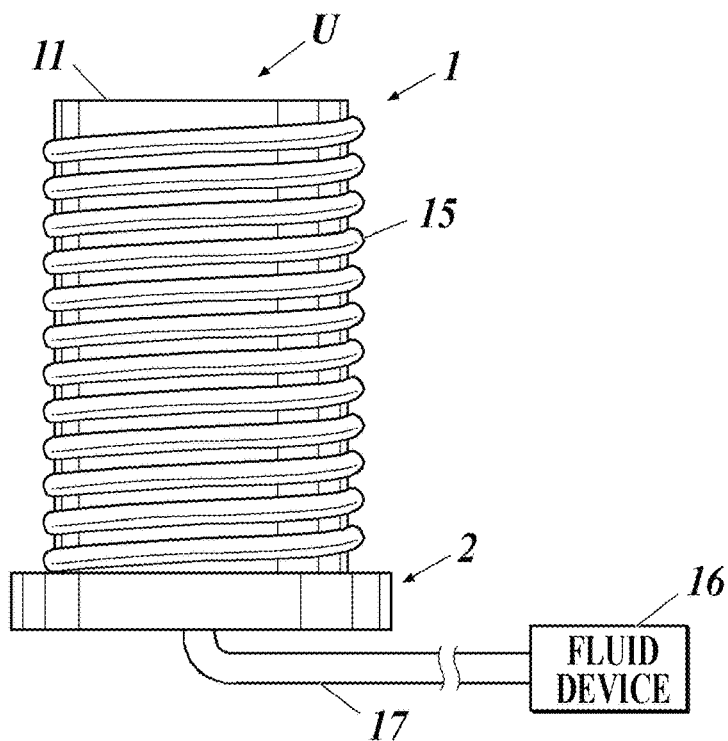
FIG. 1 is a side view of a soft actuator device, according to some embodiments.

First, the configuration of a soft actuator device U will be described. FIG. 1 is a side view of the soft actuator device U, according to some embodiments.

As shown in FIG. 1, in some embodiments, the soft actuator device U may include a soft actuator 1 and a base 2. In some embodiments, the soft actuator 1 may include a cylinder 11, a coil 15, a fluid device 16, and a tube 17.

The soft actuator 1 is a device that is capable of driving an object. Specifically, the soft actuator 1 is a device that, for example, moves an object in a linear fashion using the pressure of a fluid (e.g., a gas or a liquid). Accordingly, the soft actuator 1 can be used for the same purpose as an air cylinder.

The base 2 serves as a foundation for fixing the soft actuator 1. The base 2 is formed of, for example, a rigid body. In some embodiments, the base 2 may be made of a resin material. The base 2 serves as an adapter for attaching the soft actuator 1, which is fixed to the base 2, to a housing or analogous structure of a target mechanical apparatus (e.g., a robot apparatus). In some embodiments, the base 2 may be formed of a rigid body made of a metallic material.

[Configuration of Soft Actuator]

Figure 2:
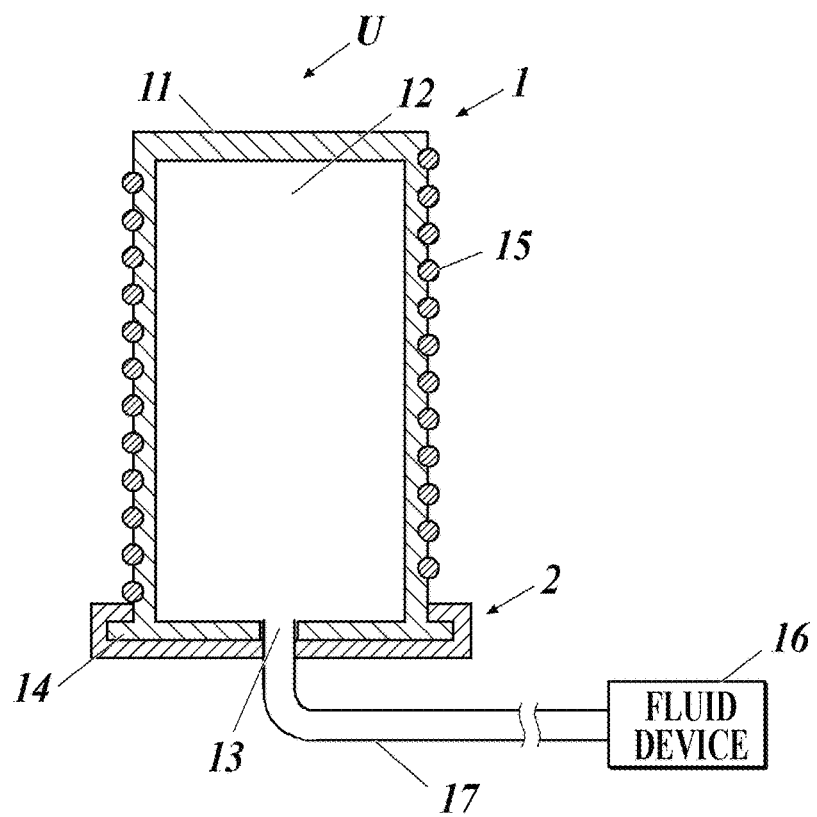
FIG. 2 is a side cross-sectional view of the soft actuator device shown in FIG. 1 with a cylinder, a coil, and a base broken, according to some embodiments.
Figure 3:
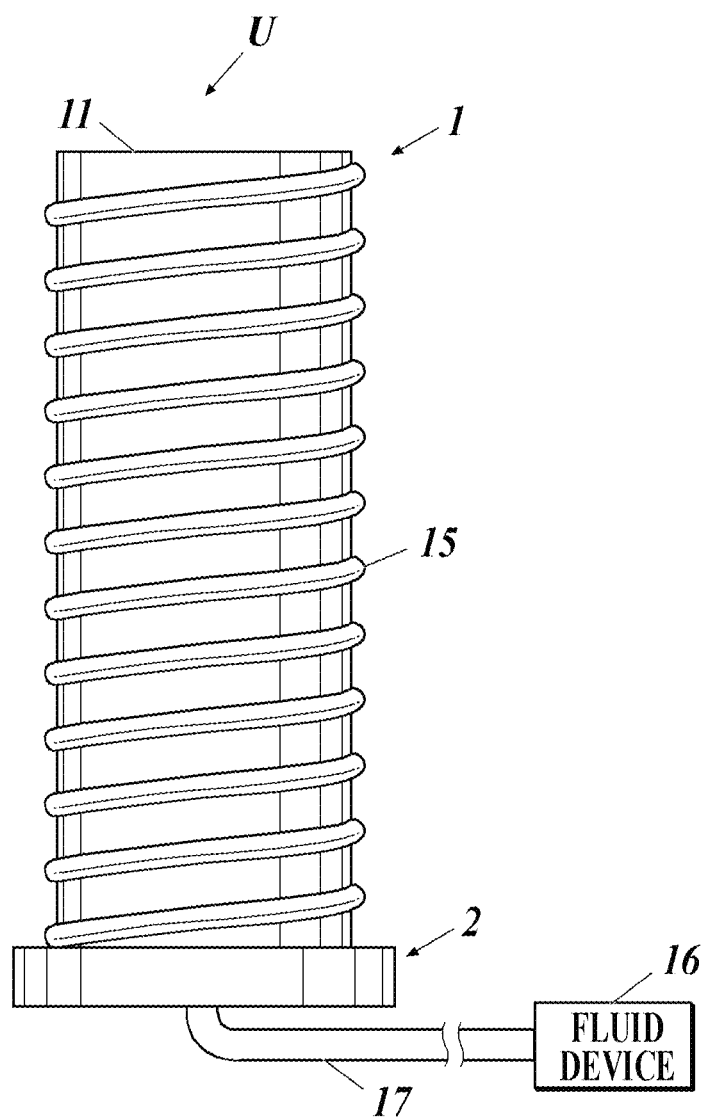
FIG. 3 is a side view of the soft actuator device shown in FIG. 1 when the soft actuator is expanded in an axial direction, according to some embodiments.

Next, the configuration of the soft actuator 1 will be described. FIG. 2 is a side cross-sectional view of the soft actuator 1 shown in FIG. 1 in which the base 2 is removed and the cylinder 11 and the coil 15 are cut into cross-section, according to some embodiments. FIG. 3 is a side view of the soft actuator device U shown in FIG. 1 when the soft actuator 1 is expanded in the axial direction, according to some embodiments.

As described above, in some embodiments, the soft actuator 1 includes the cylinder 11, the coil 15, the fluid device 16, and the tube 17.

The cylinder 11 is a cylindrical cylinder that has both end faces in the axial direction closed and that has a space 12 inside. However, a flow inlet 13 is formed in one end face of the cylinder 11, allowing a fluid (e.g., a gas or a liquid) to flow into the space 12. The shapes of the inner and outer peripheries of the cylinder 11 in the cross section perpendicular to the axial direction are not limited to circular shapes. In some embodiments, the shapes may be polygonal shapes, such as quadrangular shapes and hexagonal shapes, or oval shapes. Moreover, while the present disclosure focuses on a configuration of a soft actuator device U using a cylinder 11, embodiments are not limited thereto and, in some embodiments, the soft actuator 1 may be formed of a body of any shape as long as the body is flexible and may be expanded and contracted using fluid as described herein.

The cylinder 11 is formed of a flexible, soft material. Specifically, in some embodiments, the cylinder 11 may be formed of a rubber-based material that has rubber elasticity. For example, in some embodiments, the cylinder 11 may be formed of silicone rubber. The cylinder 11 is elastic in the axial and circumferential directions.

When a fluid flows into the space 12 via the flow inlet 13, the pressure within the space 12 becomes higher than an external pressure, thereby inducing the cylinder 11 to extend in the axial direction. At this time, a radial expansion force is applied to the cylinder 11 by the fluid. However, the coil 15 serves to suppress the expansion of the cylinder 11 in the circumferential direction and to suppress the diameter expansion of the cylinder 11. The diameter expansion of the cylinder 11 means that the diameter of the cylinder 11 increases as the cylinder 11 expands in the circumferential direction. The coil 15 allows the extension and contraction of the cylinder 11 in the axial direction.

The cylinder 11 includes a flange 14 at an end on the side where the flow inlet 13 is formed. In some embodiments, the flange 14 may protrude in the radial direction of the cylinder 11. In some embodiments, the flange 14 may protrude outward in the radial direction beyond an outer peripheral surface of the coil 15 wound around an outer periphery of the cylinder 11. In some embodiments, the flange 14 may be formed in a disk shape. The flange 14 serves the purpose of fixing the soft actuator 1 to the base 2 through engagement with a groove 22 formed in the base 2 to be described further below.

The coil 15 is located radially outside the inner periphery of the cylinder 11 and is wound around the cylinder 11 in a spiral shape along the central axis of the cylinder 11. Specifically, the coil 15 is wound around the outer periphery of the cylinder 11 in a spiral shape along the central axis of the cylinder 11 and is in contact with the outer periphery of the cylinder 11. A portion of the coil 15, specifically the inner periphery of the coil 15, bites inward from the outer periphery of the cylinder 11, being embedded in the cylinder 11. Accordingly, the outer periphery of the coil 15 is exposed on the outer periphery of the cylinder 11.

In some embodiments, unlike that shown in FIGS. 1-3, the coil 15 may be exposed on neither the inner nor outer periphery of the cylinder 11, but rather the coil 15 may be entirely embedded between the inner and outer peripheries of the cylinder 11. In this case, the cylinder 11 may be regarded as an insulating film, serving to insulate the coil 15.

In some embodiments, the coil 15 may have electric conductivity. For example, in some embodiments, the coil 15 may be formed of a conductive material such as copper, a copper alloy, aluminum, an aluminum alloy, stainless steel, and/or a conductive resin. In some embodiments, the coil 15 may be a conductive wire covered with an insulating film such as an insulating resin film and/or a metal oxide film.

As described above, the coil 15 suppresses the expansion of the cylinder 11 in the circumferential direction and the diameter expansion of the cylinder 11. This suppression is due to the fact that the coil 15 is wound around the cylinder 11 in a spiral shape along the central axis of the cylinder 11.

As the cylinder 11 extends in the axial direction due to an increase in pressure within the space 12, the pitch of the coil 15 widens, and the coil 15 extends in the axial direction (see FIG. 3). As the cylinder 11 contracts in the axial direction due to a decrease in pressure within the space 12, the pitch of the coil 15 narrows, and the coil 15 contracts in the axial direction (see FIG. 1). The coil 15 serves as a spring. When the coil 15 extends or contracts in the axial direction from its natural state, an elastic force is generated that attempts to restore the coil 15 to its natural state.

The inner periphery of the coil 15 bites inward from the outer periphery of the cylinder 11, thereby preventing the coil 15 from slipping with respect to the cylinder 11 in the axial direction. Specifically, even when the cylinder 11 extends or contracts in the axial direction, the coil 15 does not slip with respect to the cylinder 11 in the axial direction. Consequently, the coil 15 extends or contracts in the axial direction together with the cylinder 11.

In some embodiments, the coil 15 can be utilized as an inductor within an electrical circuit. For the coil 15 being an inductor, the inductance of the coil 15 is correlated with the length of the coil 15 in the axial direction. Thus, the length of the coil 15 and the amount of change thereof can be converted from the inductance of the coil 15 and the amount of change thereof. Accordingly, in some embodiments, the coil 15 can be utilized as a sensor for measuring the elongation of the cylinder 11 and the amount of change thereof.

In some embodiments, the fluid device 16 may include a compressor, a valve, and the like. The fluid device 16 supplies a fluid to the space 12 in the cylinder 11 via the tube 17 and controls the pressure of the fluid supply. The tube 17 is connected to the flow inlet 13 of the cylinder 11 at one end and to the fluid device 16 at the other end.

[Configuration of Base]

Next, the configuration of the base 2 will be described.

In some embodiments, the base 2 may be disk-shaped. In some embodiments, the diameter of the base 2 may exceed the diameter of the flange 14. In some embodiments, the thickness of the base 2 may be greater than the thickness of the flange 14. The base 2 may have a recess 21 (see FIG. 4) on its upper surface for receiving the axial end of the cylinder 11. The base 2 may have a groove 22 (see FIG. 4) on the inner side surface of the recess 21, in which the flange 14 can be engaged and attached. In some embodiments, the base 2 may have, for example, an insertion hole 23 (see FIG. 4) through which the tube 17 can be inserted. Consequently, even with the soft actuator 1 being fixed to the base 2, a fluid can be supplied to the space 12 in the cylinder 11 via the tube 17. In some embodiments, the base 2 may have a screw hole or the like to screw the base 2 to a target mechanical device. In some embodiments, the base 2 may be made of a metallic material.

[Fixing Method for Soft Actuator]

Figure 4:
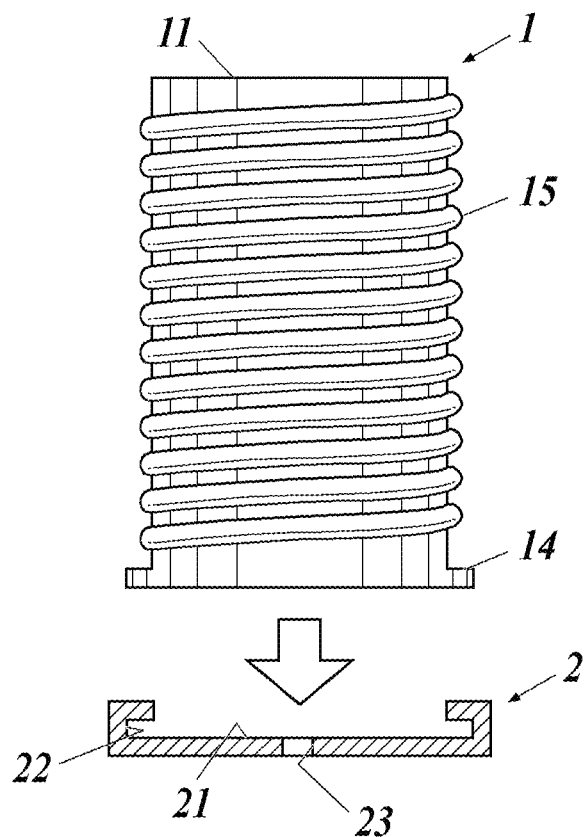
FIG. 4 is a diagram for describing an example of a fixing method for a soft actuator, according to some embodiments.
Figure 5:
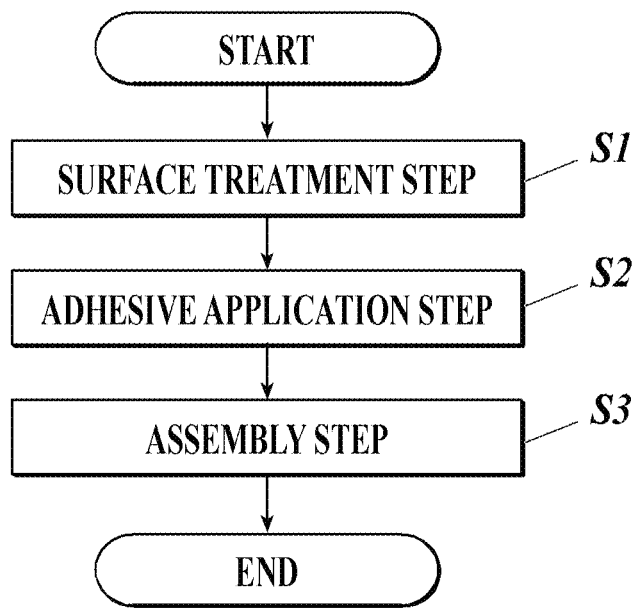
FIG. 5 is a flowchart illustrating an example of a procedure for fixing a soft actuator to a base, according to some embodiments.

Next, a method for fixing the soft actuator 1 to the base 2 will be described. FIG. 4 is a diagram for describing an example of a fixing method for the soft actuator 1, according to some embodiments. FIG. 4 shows the soft actuator 1 in a side view and the base 2 in a side cross-sectional view. FIG. 5 is a flowchart illustrating an example of a procedure for fixing the soft actuator 1 to the base 2. When fixing the soft actuator 1 to the base 2, the fluid device 16 and the tube 17 are detached from the soft actuator 1.

As shown in FIG. 4 and FIG. 5, in fixing the soft actuator 1 to the base 2, a surface treatment operation (S1) is first performed to modify the bonding surface of the cylinder 11 to the base 2. Specifically, in the surface treatment operation (S1), the bonding surface may be modified by applying a primer (for example, n-heptane) an end of the cylinder 11 which will be in contact with the base 2 when the flange 14 of the cylinder 11 and the groove 22 of the base 2 are engaged with each other in the assembly operation (S3) described below. The method of modifying the bonding surface of the cylinder 11 is not limited to applying a primer. For example, in some embodiments, the bonding surface may be heated. In some embodiments, a plasma or ion irradiation may be performed on the bonding surface. In some embodiments, the aforementioned modification may be performed not only on the cylinder 11 but also on the base 2. In some embodiments, the modification may be performed solely on the base 2.

Next, an adhesive application operation (S2) is performed to apply an adhesive to both the cylinder 11 and the base 2. Specifically, in some embodiments, the adhesive may be a cyanoacrylate adhesive. In some embodiments, the adhesive may be applied on only one of the cylinder 11 or the base 2.

Next, an assembly operation (S3) is performed to assemble the soft actuator 1 to the base 2. Specifically, the end of the cylinder 11 to which the adhesive is applied in the adhesive application operation (S2) is fitted into the recess 21 of the base 2 to engage the flange 14 with the groove 22.

Through the aforementioned operations, the soft actuator 1 may be firmly fixed to the base 2 as shown in FIG. 2. In the fixing method, the coil 15 may be attached to the cylinder 11 after the cylinder 11 is assembled to the base 2 by itself.

As described above, the soft actuator fixing method according to various embodiments is a soft actuator fixing method for fixing the soft actuator 1 to the base 2. The soft actuator 1 includes: the cylinder 11 that is elastic in the axial and circumferential directions; and the coil 15 that is wound around the cylinder 11 in a spiral shape, suppresses the diameter expansion of the cylinder 11, and extends and contracts in the axial direction in accordance with the extension and contraction of the cylinder 11 in the axial direction due to the increase and decrease in pressure within the cylinder 11. The cylinder 11 includes the flange 14 at an end in the axial direction. The base 2 includes the recess 21 that receives the end. The recess 21 has the groove 22 that engages with the flange 14. The soft actuator 1 is fixed to the base 2 by engaging the flange 14 and the groove 22 with each other. This structure and operation makes it difficult for the soft actuator 1 to come off the base 2, thereby reinforcing the fixation of the soft actuator 1 to the base 2.

The soft actuator fixing method according to various embodiments includes the surface treatment operation (S1) of modifying the surface of the cylinder 11 among the surfaces on which the cylinder 11 and the base 2 are in contact with each other when the flange 14 and the groove 22 are engaged with each other, and the adhesive application operation (S2) of applying an adhesive to the surfaces on which the cylinder 11 and the base 2 are in contact with each other. This configuration and operation allows the flange 14 and the groove 22 to be suitably bonded to each other, thereby making it possible to more firmly fix the soft actuator 1 to the base 2.

In the surface treatment operation (S1) of the soft actuator fixing method according to various embodiments, a primer (for example, n-heptane) is applied to the bonding surface of the cylinder 11 to the base 2 to modify the bonding surface. This configuration and operation makes it easier for an adhesive to fit into the bonding surface of the cylinder 11 to the base 2, thereby allowing for proper bonding of the cylinder 11 and the base 2.

The description of the above embodiments is an example of the soft actuator fixing method according to the present disclosure, and are not limited thereto.

For example, in the embodiments, in a case where the base 2 is disk-shaped or the like in which the recess 21 and the groove 22 are absent, the soft actuator 1 may be fixed to the base 2 by: modifying the end surface (bottom surface) of the cylinder 11 where the flange 14 is formed; applying an adhesive to each of the modified end surface and the upper surface of the base 2; and bonding the cylinder 11 and the base 2 to each other. In such a case, the flange 14 can be absent in the cylinder 11. Examples of the above modification method include applying a primer to a surface to which an adhesive is to be applied, heating the surface, and performing plasma or ion irradiation on the surface. The above modification may be performed not only on the cylinder 11 but also on the base 2.

In the above embodiments, the soft actuator 1 is fixed to the base 2 via the cylinder 11 of the soft actuator 1. However, in some embodiments, the soft actuator 1 may be fixed to the base 2 via the coil 15 of the soft actuator 1. In such a case, when the base 2 and the coil 15 are formed of a metallic material, the coil 15 may be fixed to the base 2 by means of joining the coil 15 and the base 2 through, for example, welding, soldering, or the application of an adhesive for metal. Then, the material of the cylinder 11 (e.g., silicone rubber) may be poured into a mold with a portion of the coil 15, which is joined to the base 2, fitted into the mold. This configuration may produce the soft actuator 1 in which the coil 15 bites inward from the outer periphery of the cylinder 11. Subsequently, the material of the cylinder 11 is poured into the recess 21 and groove 22 of the base 2 to form the cylinder 11 having the flange 14. This configuration may produce the soft actuator device U in which the flange 14 of the cylinder 11 and the groove 22 of the base 2 are engaged with each other. In some embodiments, the base 2 may be formed in a disk shape or the like without the aforementioned recess 21 and groove 22. In this case, as described above, the coil 15 may be fixed to the base 2 by means of joining the coil 15 and the base 2 through, for example, welding, soldering, or the application of an adhesive for metal. Then, the material of the cylinder 11 (e.g., silicone rubber) may be poured into a mold with a portion of the coil 15, which is joined to the base 2, fitted into the mold. This configuration may produce the soft actuator 1 in which the coil 15 bites inward from the outer periphery of the cylinder 11. In this case, the soft actuator 1 may be produced by inserting the cylinder 11 produced in advance into the coil 15 fixed to the base 2. In addition, the flange 14 may be absent in the cylinder 11.

According to some embodiments, methods of fixing the soft actuator 1 to the base 2 also include the following.

In a first method, first produced is a structure in which the coil 15 and the base 2 are unitarily formed. Then, the material of the cylinder 11 (e.g., silicone rubber) is poured into a mold with a portion of the coil 15 in the structure fitted into the mold. This configuration may produce the soft actuator 1 in which the coil 15 bites inward from the outer periphery of the cylinder 11. Subsequently, the material of the cylinder 11 is poured into the recess 21 and groove 22 of the base 2 to form the cylinder 11 having the flange 14. This configuration and operation may produce the soft actuator device U in which the flange 14 of the cylinder 11 and the groove 22 of the base 2 are engaged with each other. Methods of producing the aforementioned structure may include using a metal 3D printer or carving out the structure from a block of material (e.g., a cylindrical material, and/or a columnar material). The base 2 may be formed in a disk shape or the like without the aforementioned recess 21 and groove 22. In this case, a structure in which the coil 15 and the base 2 are unitarily formed is produced. Then, the material of the cylinder 11 (e.g., silicone rubber) is poured into a mold with a portion of the coil 15 in the structure fitted into the predetermined mold. This configuration and operation produces the soft actuator 1 in which the coil 15 bites inward from the outer periphery of the cylinder 11. In this case, the soft actuator 1 may be produced by inserting the cylinder 11 produced in advance into the coil 15 unitarily formed with the base 2. In addition, the flange 14 may be absent in the cylinder 11.

The specific details of the configuration of the soft actuator device U and the soft actuator fixing method described above can be appropriately modified without departing from the gist of the present disclosure and all such modifications are intended to be included within the scope of the appended claims.

Embodiments consistent with the present disclosure can be utilized in a soft actuator fixing method and a soft actuator device.

What is claimed is:

1. A method for fixing a soft actuator to a base, the soft actuator including:

a cylinder that includes a flange at an end in an axial direction, the cylinder being elastic in the axial direction and in a circumferential direction; and a coil that is wound around the cylinder in a spiral shape, suppresses a diameter expansion of the cylinder, and extends and contracts in the axial direction in accordance with an extension and contraction of the cylinder in the axial direction due to an increase and decrease in pressure within the cylinder;

the base having a recess that comprises a groove, the method comprising:

engaging the flange and the groove with each other to fix the soft actuator to the base; and unitarily forming the base and the coil.

2. The method according to claim 1, further comprising:

modifying at least one surface of a first surface of the cylinder that contacts the base or a second surface of the base that contacts the cylinder; and applying an adhesive to the at least one surface.

3. The method according to claim 2, wherein the at least one surface is modified by applying a primer to the at least one surface.

4. The method according to claim 2, wherein the at least one surface is modified by heating the at least one surface.

5. The method according to claim 2, wherein the at least one surface is modified by performing plasma irradiation or ion irradiation on the at least one surface.

6. The method according to claim 1, wherein the base and the coil are integrally formed by 3D printing.

7. The method according to claim 1, wherein the base and the coil are integrally formed by carving out the base and the coil from a block of a material.

8. A soft actuator device comprising:

a soft actuator comprising a cylinder that is elastic in an axial direction and in a circumferential direction, the cylinder including a flange at an end in the axial direction, and a coil that is wound around the cylinder, suppresses a diameter expansion of the cylinder, and extends and contracts in the axial direction in accordance with an extension and contraction of the cylinder in the axial direction due to an increase and decrease in pressure within the cylinder; and a base comprising a recess that has a groove, the groove engaging with the flange of the cylinder, wherein the base and coil are unitarily formed as a single structure.

9. A soft actuator device comprising:

a soft actuator comprising an elastic body that is configured to extend and contract in an axial direction and in a radial direction, and a coil that is wound around the elastic body, that is configured to extend and contract in the axial direction in accordance with the elastic body, and that is configured to suppress an expansion of the elastic body in the radial direction; and a base that receives an end of the soft actuator, wherein the base and coil are unitarily formed as a single structure.

10. The soft actuator device according to claim 9, wherein the base includes a recess into which the end of the soft actuator is received.

11. The soft actuator device according to claim 10, wherein:

the soft actuator includes a flange at the end of the soft actuator, the recess of the base includes a groove, and the groove engages with the flange.

12. The soft actuator device according to claim 9, further comprising an adhesive on the end of the soft actuator.

13. The soft actuator device according to claim 12, further comprising an adhesive on a surface of the base which contacts the end of the soft actuator.

14. The method according to claim 1, wherein the cylinder and the flange are elastic in the axial direction and in a circumferential direction, and the elastic flange protrudes from a sidewall of the cylinder to extend further in a radial direction from the sidewall of the cylinder, wherein the base comprises a bottom wall, a top wall spaced apart from the bottom wall, and a sidewall connecting the bottom wall to the top wall, the bottom wall, top wall and sidewall defining the groove that extends in a radial direction, and wherein the flange and the groove are radially engaged with each other to fix the soft actuator to the base.

15. The soft actuator device according to claim 8, wherein the flange is an elastic flange protruding from a sidewall of the cylinder to extend further in a radial direction from the sidewall of the cylinder, and the base comprises a bottom wall, a top wall spaced apart from the bottom wall, and a sidewall connecting the bottom wall to the top wall, the bottom wall, top wall and sidewall defining the groove that extends in a radial direction, the groove engaging radially with the flange of the cylinder.

16. The soft actuator device according to claim 9, wherein the elastic body comprises a radial portion at a proximal end thereof that protrudes from a sidewall of the elastic body to extend further in a radial direction from the sidewall of the elastic body, the base comprises a first wall and a second wall spaced apart from the first wall to define a radial groove therein, and the radial groove radially receives the radial portion of the soft actuator.

17. The soft actuator device according to claim 9, wherein the base includes an opening in the first wall that defines a recess into which the proximal end of the soft actuator is received.

18. The soft actuator device according to claim 10, wherein:

the radial portion forms an elastic flange, and the radial groove engages with the elastic flange.

19. The method according to claim 1, wherein the flange and the cylinder are integrally formed.

20. The method according to claim 1, wherein the flange and the cylinder are formed of a same material.

\* \* \* \* \*